June 5, 1956
D. A. DOTSON
2,749,047
THERMOSTATIC VALVE
Filed April 25, 1952
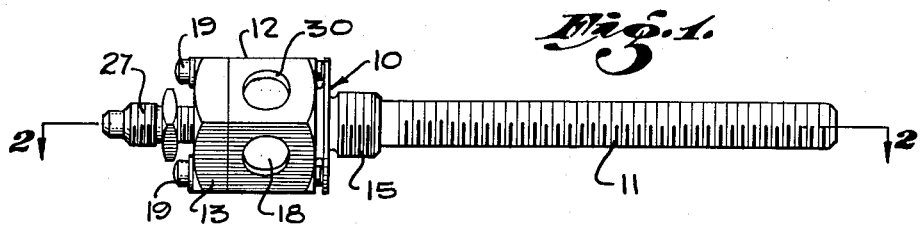
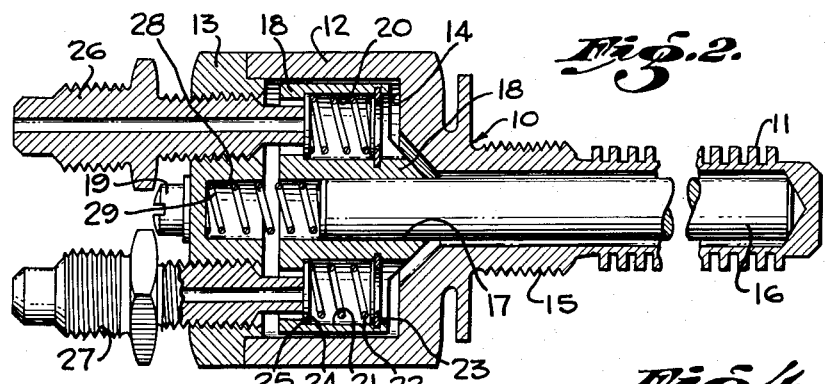
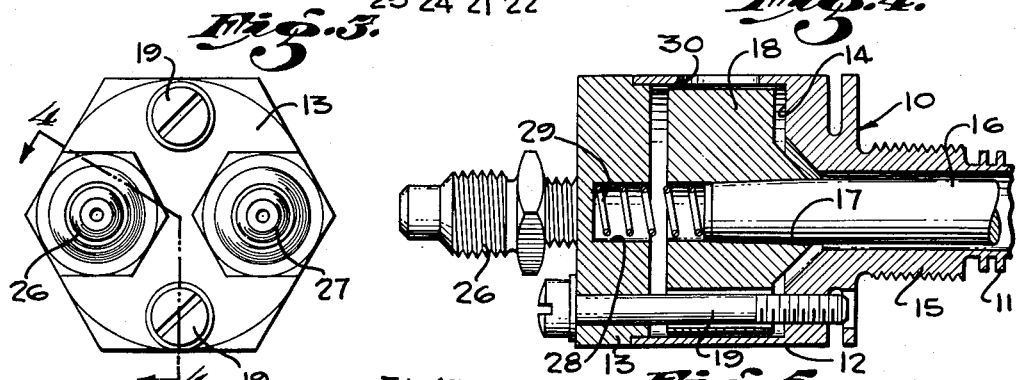
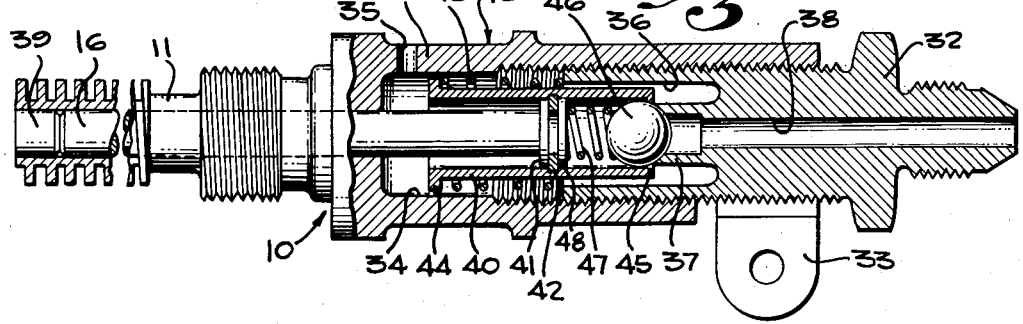
DONALD A. DOTSON,
INVENTOR.
BY
ATTORNEY United States Patent Office 2,749,047
Patented June 5, 1956

2,749,047

THERMOSTATIC VALVE

Donald A. Dotson, Los Angeles, Calif., assignor to The Garrett Corporation, Los Angeles, Calif., a corporation of California Application April 25, 1952, Serial No. 284,389

6 Claims. (Cl. 236—102)

The present invention relates generally to a valve structure, and is more particularly concerned with a valve of the type which is responsive to temperature changes.

The present invention constitutes a continuation-in-part of my copending application, Serial No. 215,207, filed March 13, 1951.

In accordance with the broad concept of the present invention, it is proposed to provide a novel thermostatic valve for controlling a fluid flow, such as air, in response to temperature variations, which is simple in construction, reliable in operation, and which is easy to adjust.

Further objects of the invention will be brought out in the following part of the specification, wherein detailed description is for the purpose of fully disclosing the invention without placing limitations thereon.

Referring to the accompanying drawing, which is for illustrative purposes only:

Fig. 1 is an elevational view of a thermostatic valve embodying the features of the present invention;

Fig. 2 is a longitudinal section through the valve, taken substantially on line 2—2 of Fig. 1;

Fig. 3 is an end view of the head portion of the valve;

Fig. 4 is a fragmentary sectional view, taken substantially on line 4—4 of Fig. 3; and Fig. 5 is a modified construction of the valve of the present invention.

As shown in Figs. 1 and 2, the thermostatic valve of the present invention is constructed with a hollow housing as generally indicated by numeral 10. This housing is formed with an elongate tubular wall portion 11 having one end closed and its other end expanded to form an enlarged cup-shaped portion 12 closed by a cover 13 which cooperates therewith to form an interior chamber 14. At the junction of the portions 11 and 12, the portion 11 is formed with a threaded shoulder 15 by means of which the valve may be mounted in a threaded opening forming a part of a support.

As shown in Fig. 1, the tubular wall portion 11 is threaded throughout its length in order to increase the thermal sensitivity by increasing the exposed wall area subject to the temperature of the turbine exhaust gas. The tubular wall portion 11 has mounted therein a core member 16 which has a different coefficient of thermal expansion than the material used in the housing. For example, the housing may be constructed of material such as aluminum alloy, stainless steel, etc., while the core member may be constructed of material such as a suitable ceramic material, quartz, etc. The choice of materials will, of course, be dictated by the temperatures to be withstood and the thermal coefficients of expansion characteristic of the particular materials.

The innermost end of the core 16 extends into the chamber 14 and is secured within a central bore 17 of a retainer 18 which is supported for axial guided movement within the chamber 14 by diametrically positioned cover securing screws 19.

In 90° relation to the screws 19, the retainer is drilled or otherwise formed to provide diametrically opposed bores 20 and 21, within which there is positioned in each case an expansion spring 22. One end of this spring bears against a ring retainer 23 while the other end of the spring engages against a valve member 24 which is thus biased in a seating direction towards a movement limiting shoulder 25 at this end of the associated bore.

Conduit connection fittings 26 and 27 are threadedly mounted in the cover 13 for longitudinal adjustable movements. These fittings are mounted on a diameter of the cover and have their innermost ends projecting into the chamber 14 in axial alignment with the valve members 24—24, so that they form seats for these valves.

The cover 13 is provided with a central recess 28 which forms a seat for one end of an expansion spring 29, the other end of this spring bearing against the adjacent end of the core member 16 so that the core member with its associated retainer 18 is biased in a direction away from the cover 13, movement in biased direction being limited by engagement of the outer end of the core member with the bottom of the tubular wall portion 11. As indicated in Fig. 4, the interior of the chamber 14 communicates with atmosphere through a plurality of port openings 30 which are formed in the wall of the portion 12.

Normally, the valves in their seated positions prevent flow of air from the fittings into the chamber 14 and thence to atmosphere through the openings 30. When, however, a temperature increase occurs the housing will expand lengthwise more than the core 16. The spring 29, under such conditions, urges the retainer in a direction to carry the valve members 24 together with their biasing springs away from their associated valve seats. Thus, conduits connected to the fittings 26 and 27 may be connected with atmosphere through the chamber 14 and communicating openings 30.

Since the fittings 26 and 27 are threadedly adjustable in the cover, this permits calibration of the temperature at which the valve members 24—24 will be unseated, and this calibration may be such that the valves may be unseated together, or at different temperatures depending upon the adjustment of the fittings.

The valve as described above, it will be noted, is designed for the purpose of controlling a plurality of flow passages. In some installations, it may be desirable to control a single flow passage, and in such case a modified arrangement such as disclosed in Fig. 5 may be utilized.

The operation in general of the modified arrangement is the same as that previously described. It will be noted however that instead of the hollow housing being cup-shaped, the housing in this case is constructed with an enlarged elongate tubular portion 31 which interconnects with the wall portion 11 at one end, and at its other end is internally threaded to adjustably receive therein a tubular conduit connector fitting 32. The adjacent end of the tubular portion 31 is split and deformed to provide a pair of threaded clamping members 33 (only one being shown) by means of which the adjusted position of the connector fitting within the tubular portion may be releasably secured.

The tubular portion 31 and the connector fitting 32 cooperate to form a chamber 34 which is shown as communicating through a passage 35 with ambient or atmospheric air. The innermost end of the connector fitting is formed with an end opening recess 36 containing in its bottom a tubular projection 37 which forms a valve seat and which communicates with an axial passageway 38 extending through the connector fitting. The distal end of the tubular wall portion 11 is, in this case, closed by a plug 39 which forms an abutment for one end of the associated core member 16, the opposite end of the core member projecting into the chamber 34 in axial alignment with the tubular projection 37.

This end of the core 16 extends into one end of a tubular sleeve 40 where it engages against a seating disc 41 which is restrained against movement in one direction by a snap ring 42 anchored within the tubular sleeve between its ends. The tubular sleeve is resiliently retained in cooperative association with the adjacent end of the core 16 by means of an expansion spring 43 which surrounds the sleeve and has one end bearing against an outwardly projecting end flange 44 formed on the sleeve, and its other end abutting the inner end of the connector fitting 32.

At its opposite end, the tubular sleeve 40 is formed with an inwardly projecting flange 45 which forms a restraining abutment for a ball valve member 46. The valve member 46 is resiliently held against the flange 45 by means of an expansion spring 47 which is interposed between the valve member and a seating disc 48 bearing against the snap ring 42.

It will be observed that the tubular projection 37 thus forms a seat for the valve member 46, this tubular projection being so arranged that it may extend into the associated end of the tubular sleeve 40 so as to depress the valve member a greater or less amount depending upon the adjusted position of the connector fitting 32. It is thus possible to regulate the temperature change which must take place before the valve member will be unseated from the tubular projection 37.

It is appreciated that various modifications may suggest themselves to those skilled in the art without departing from the spirit of the present invention, and, hence, it is desired that the invention shall not be restricted to the form or forms shown or uses mentioned, except to the extent indicated in the appended claims.

I claim:

1. Valve apparatus, comprising: a hollow housing having an elongate tubular wall portion closed at one end and connected at its other end with an enlarged head wall portion defining a chamber; a core member positioned in the tubular portion and having one end extending into said chamber, said core member and tubular wall portion of the housing having different coefficients of thermal expansion; tubular means having one end surrounding the end of the core which is positioned in said chamber; a spring having end connections respectively with said tubular means and said housing, and acting to normally bias said tubing means and core member axially in a direction toward the closed end of the tubular wall portion; a valve in said chamber carried by said tubular means, said valve member being further supported for independent limited movement in a seating direction; and a tubular connector supported in the head wall portion for endwise adjustable movement, one end of said connector being positioned within said chamber and defining a seat for said valve member, and the other end of said connector being positioned exteriorly of said head wall portion and adapted for connection with a conduit.

2. Valve apparatus according to claim 1, which includes a plurality of said valve members respectively associated with a plurality of said tubular connectors.

3. Valve apparatus according to claim 1, wherein a plurality of said valve members are respectively associated with a plurality of said tubular connectors, and the connectors are independently adjustable to vary the seating and unseating characteristics of the associated valve members.

4. Valve means according to claim 1, wherein a plurality of said valve members are respectively associated with a plurality of said tubular connectors, and the connectors are independently adjustable to relatively vary the seating and unseating characteristics of the associated valve members, said valve members and associated tubular connectors being symmetrically positioned about the longitudinal axis of said core member.

5. Valve apparatus, comprising: a hollow housing having an elongate tubular wall portion closed at one end and connected at its other end with an enlarged head wall portion; a core member positioned in the tubular portion and having one end extending into said chamber, said core member and tubular wall portion of the housing having different coefficients of thermal expansion; tubular means having one end surrounding an end of said core; spring means retaining said tubular means and associated core end in engagement, one end of said spring bearing against said tubular means; a valve member carried by said tubular means at its other end; and a tubular connector supported in the head wall portion having an inner end engaged by the other end of said spring and further providing a seat cooperatively associated with said valve member, the outer end of said connector being adapted for connection with a conduit.

6. Valve apparatus, comprising: a hollow housing having an elongate tubular wall portion closed at one end and connected at its other end with an enlarged head wall portion defining a chamber; a core member positioned within the tubular portion and having one end extending into said chamber, said core member and tubular wall portion of the housing having different coefficients of thermal expansion; tubular means having one end surrounding the end of the core which is positioned in said chamber; a spring normally biasing said tubular means and core member axially in a direction toward the closed end of said tubular wall portion; a valve member in said chamber carried by said tubular means, said valve member being further supported for independent limited movement in a seating direction; a tubular connector supported in the head wall portion for endwise adjustable movement, one end of said connector being positioned within said chamber and defining a seat for said valve member, the other end of said connector being positioned exteriorly of said head wall portion and adapted for connection with a conduit, said valve seat being positioned in an inner end recess of the connector, said recess being adapted to receive the valve end of said tubular means; and said tubular means having an outwardly extending flange at the end which surrounds said core and said spring extending between said flange and the inner end of said connector.

References Cited in the file of this patent

UNITED STATES PATENTS

| 799,505 | Wadsworth | Sept. 12, 1905 |
| 808,707 | Wadsworth | Jan. 2, 1906 |
| 896,587 | Saugstad | Aug. 18, 1908 |
| 934,116 | Weld | Sept. 14, 1909 |
| 969,848 | Davis | Sept. 13, 1910 |
| 1,117,790 | Chapman | Nov. 17, 1914 |
| 1,499,834 | Lux | July 1, 1924 |
| 1,550,694 | Hall | Aug. 25, 1925 |
| 1,856,489 | Lonergan et al. | May 3, 1932 |
| 2,241,931 | Potter | May 13, 1941 |
| 2,411,295 | Saballus | Nov. 19, 1946 |
| 2,588,350 | Budlane | Mar. 11, 1952 |

FOREIGN PATENTS

| 705,977 | France | June 17, 1931 |